W. D. JONES.
LAND MARKER.
APPLICATION FILED OCT. 12, 1912.
1,067,345.
Patented July 15, 1913.
2 SHEETS—SHEET 2.
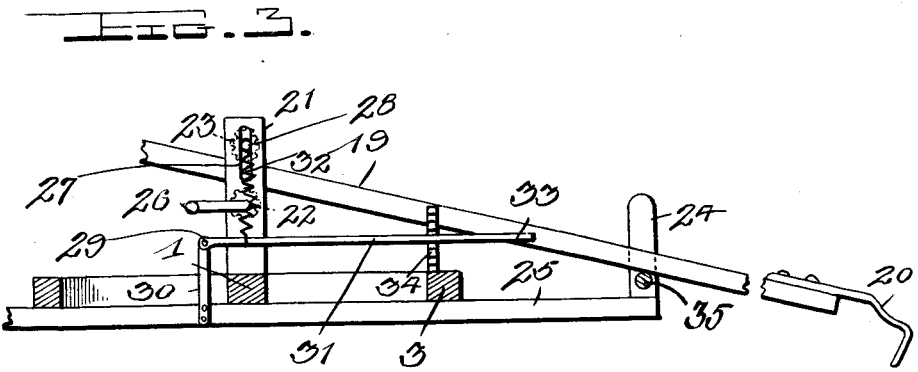
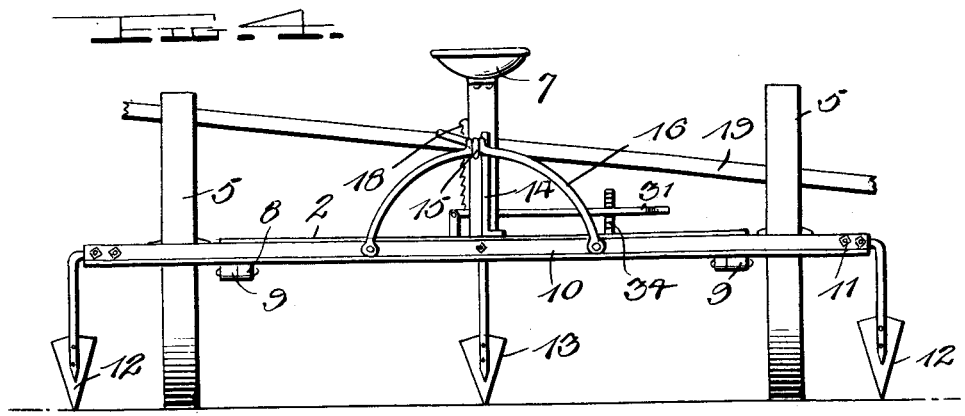
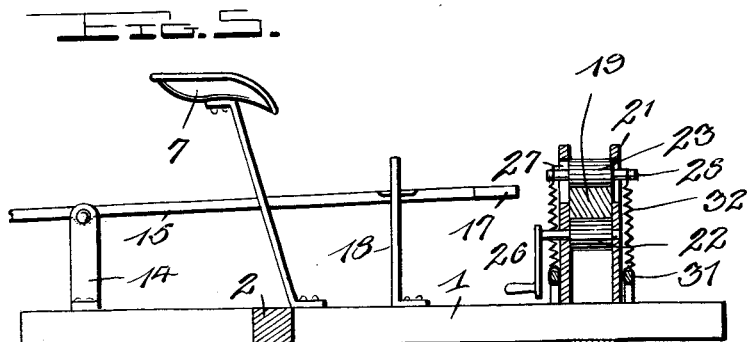
Inventor
W. D. Jones,
Witnesses
Chas. L. Griesbauer,
A. D. Hind.
By Watson E. Coleman,
Attorney

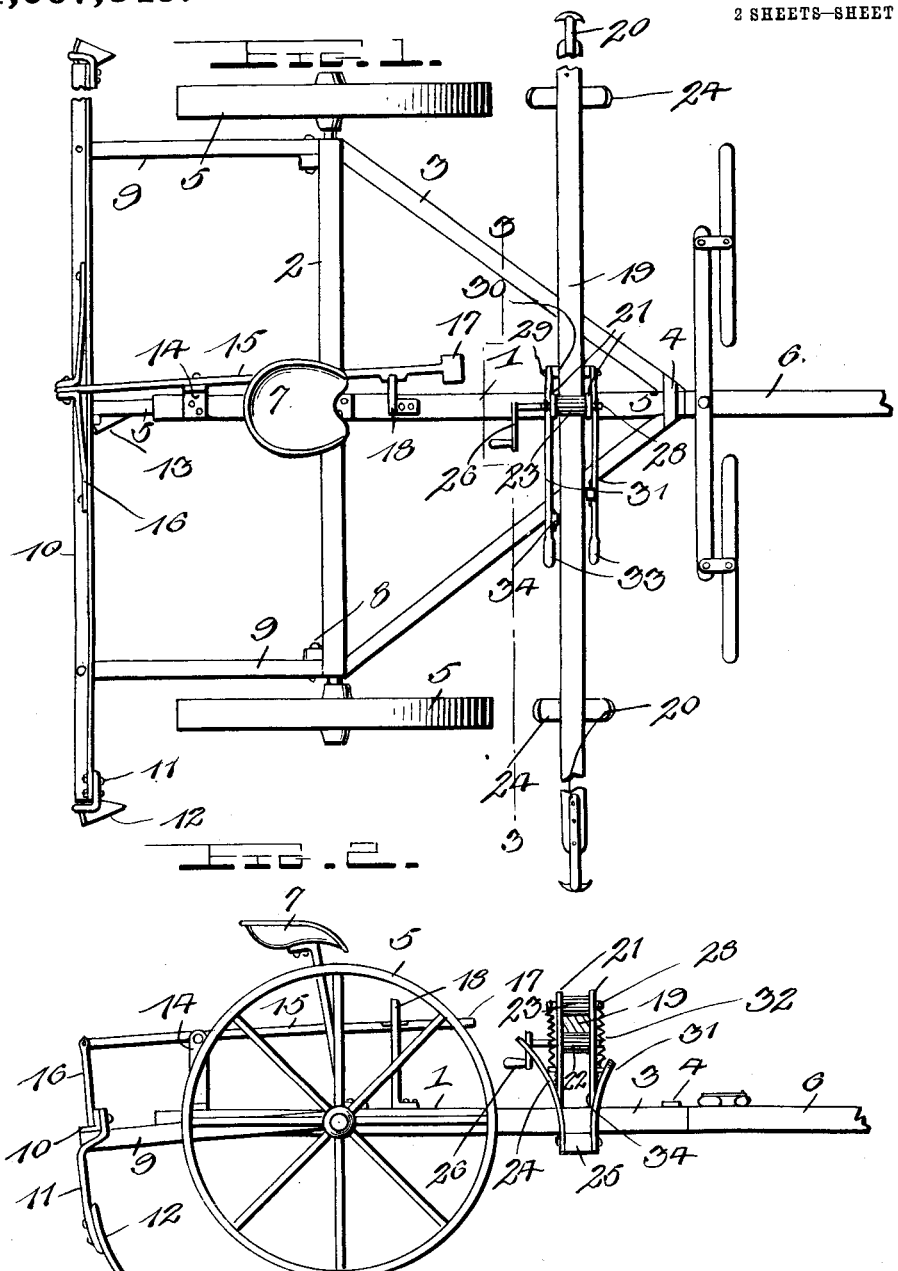

UNITED STATES PATENT OFFICE.

WILLIAM D. JONES, OF VINTON, OHIO.

LAND-MARKER.

1,067,345.  Specification of Letters Patent.  Patented July 15, 1913.

Application filed October 12, 1912. Serial No. 725,502.

*To all whom it may concern:*

Be it known that I, WILLIAM D. JONES, a citizen of the United States, residing at Vinton, in the county of Gallia and State of Ohio, have invented certain new and useful Improvements in Land-Markers, of which the following is a specification, reference being had to the accompanying drawings.

The present invention pertains to new and useful improvements in land markers of the straddle row type and has for its primary object a simple and efficient construction of a device of this character having the marking blades thereof adapted to be readily adjusted from the driver's seat.

Another object of the present invention is to provide an adjustable guide bar therefor which may be adjusted from either side of the vehicle to form rows of different widths.

With the above and other objects in view this invention consists of the novel details of construction, combination, formation and arrangement of parts as will be hereinafter more fully described and particularly pointed out in the appended claims.

For a full understanding of the present invention reference should be had to the accompanying drawings in which—

Figure 1 is a plan view embodying my invention. Fig. 2 is a side elevation of the same. Fig. 3 is a transverse section on the line 3—3 of Fig. 1. Fig. 4 is an end elevation, and Fig. 5 is a longitudinal section of my device.

Reference now being had to the accompanying drawing wherein like and corresponding parts are designated by similar reference characters throughout the several views, the invention consists of a frame work which comprises a longitudinally extending bar 1 having connected thereto adjacent the rear end thereof a transversely extending bar or axle 2 having connected adjacent its outer extremities converging bars 3 which are connected to the longitudinally extending beam 1 as at 4. Suitable supporting wheels 5 are journaled upon the axle carried by the said frame and extending from the bar 1 is the tongue 6 having a suitable draft appliance secured thereto to the draft animal may be hitched for propelling the device over the field. A driver's seat 7 is supported upon the central beam 1 and has the levers of the various mechanisms which will be hereinafter more fully described in the available use of the operator.

Pivotally secured to the transverse bar 2 as at 8, are a plurality of rearwardly extending bars 9 being preferably three in number and having secured to the outer extremities thereof a transversely extending bar 10 all of which being preferably made of angle iron. Detachably secured as at 11 upon the extremities of the bar 10 are the usual marking blades 12 and permanently secured within the medial portion of the said bar and depending therefrom is the central marking blade 13. It is to be noted in this connection that the outer extremities of the bar 10 project laterally on each side of the main frame and that the blades 12 may be adjusted upon the said bar thereby increasing the distance between the outer blades and the centrally located blade so that the marker may be used for rows having spaces of different widths apart. A support 14 is carried by the outer extremity of the longitudinally extending beam 1 and has pivotally mounted thereto a lever 15 the shorter arm of which being pivotally connected to bar 16 carried by the bar 10. The longer arm of the lever 15 projects adjacent the driver's seat and has a foot pedal 17 secured thereto thereby providing means whereby the shovels may be raised and lowered as desired. A vertically extending ratchet bar 18 is also carried by the central beam 1 and the longer arm of the lever 15 is adapted to engage the teeth of the ratchet bar 18 thereby providing means for retaining the shovels at the desired adjusted height.

As set forth in the outset of the invention one of the objects thereof was to provide an adjustable gage or land marker of this character and the gage which is to be used in connection with the present invention comprises a guide bar 19 having land markers 20 secured to the opposite extremities thereof so that the device may be used from either side of the frame.

Mounted upon the beam 1 in advance of the driver's seat are a pair of standards 21 having journaled therein a pair of corrugated rollers 22 and 23 respectively. The guide bar 19 is adapted to freely operate between the said rollers and the outer extremities thereof are supported in guides 24 secured upon the extremities of a transversely extending bar 25 carried by the frame work 1 as shown. The lower roller 22 carries a crank handle 26 whereby upon rotating the same the guide bar may be shifted to either side of the vehicle or adjusted at the desired width from either side of the vehicle, whereas the roller 23 is adjustably mounted within the standards 21 and provides means for retaining the guide bar in locked position. Formed within each of the standards 21 are vertical elongated slots 27 in which are slidably mounted the journals 28 carried by the roller 23. Pivotally mounted as at 29 upon supports 30 carried by the bar 25 is a pair of transversely extending levers 31 being connected to the journals 28 by means of coil springs 32. The outer extremities of the levers 31 are provided with foot pedals 33 whereby the levers may be adjusted for forcing the roller 23 into contact with the guide bar 19 and one bar 3 is provided with a pair of vertically extending ratchet bars 34 whereby the levers 31 may be held in their adjusted position.

It is obvious from the foregoing description taken in connection with the accompanying drawings that the guide bar may be adjusted to either side of the frame and when the roller 23 is forced in contact with the guide bar as before described, it will hold the guide bar in position thereby preventing any lateral movement thereof whereas the guides 24 will steady the land marker and present the same for use. The guides 24 are provided with rollers 35 thereby providing non-frictional means whereby the guide bar 19 may be easily adjusted to either side of the frame.

Whereas in the foregoing I have illustrated the simple and preferred form of the invention, it is, of course, to be understood that other minor details as to changes of form operation and modification may be resorted to that come within the scope of the present invention without departing from the spirit thereof or sacrificing the efficiency thereof.

I claim:

1. In a land marker, the combination with a frame, of a transverse bar carried thereby, vertical supports carried by said transverse bar, vertically spaced rollers arranged between said supports, said supports being formed with vertical elongated slots, the upper of said rollers being slidably mounted in said slots, means whereby the lower of said rollers may be operated for adjusting said guide bar, and means for moving the upper of said rollers into engagement with said guide bar to maintain the same in adjusted position, as and for the purpose described.

2. In a land marker, the combination with a frame, of a transverse bar carried by said frame, vertically extending slotted supports carried by said transverse bar, a roller journaled within said bars below said slots, a second roller slidably mounted in said slots, a guide bar operatively mounted between said rollers, means for operating the first mentioned roller for adjusting the guide bar, and means for locking the second mentioned roller in engagement with said guide bar for maintaining the same in adjusted position, as and for the purpose described.

3. In a land marker, the combination with a frame, of a transverse bar carried thereby, vertically arranged slotted bars carried by said transverse bar, a roller journaled within said supports below said slots, a second roller slidably mounted in said slots, a guide bar operatively mounted between said rollers, means for rotating the first mentioned roller for adjusting said guide bar, a lever pivotally connected to said frame, a flexible member connected at one end to said roller and at its opposite end to said lever, the second mentioned roller being adapted for engagement with said guide bar upon movement of said lever, whereby said guide bar will be maintained in adjusted position, as and for the purpose described.

4. In a land marker, the combination with a frame, of a transverse bar carried thereby, supports carried by the said transverse bar, rollers journaled within said supports, a guide bar operatively mounted between said rollers, means whereby one of the said rollers may be operated for adjusting said guide bar, means for adjusting the other said roller for retaining the guide bar in adjusted position, and guides carried by the outer extremities of said transverse bar for the reception of said guide bar, substantially as and for the purpose specified.

In testimony whereof I hereunto affix my signature in the presence of two witnesses.

WILLIAM D. JONES.

Witnesses:
WILLIAM MILLER,
M. E. BEMAN.

---

Copies of this patent may be obtained for five cents each, by addressing the "Commissioner of Patents, Washington, D. C."